2,955,360
RADAR SIMULATION

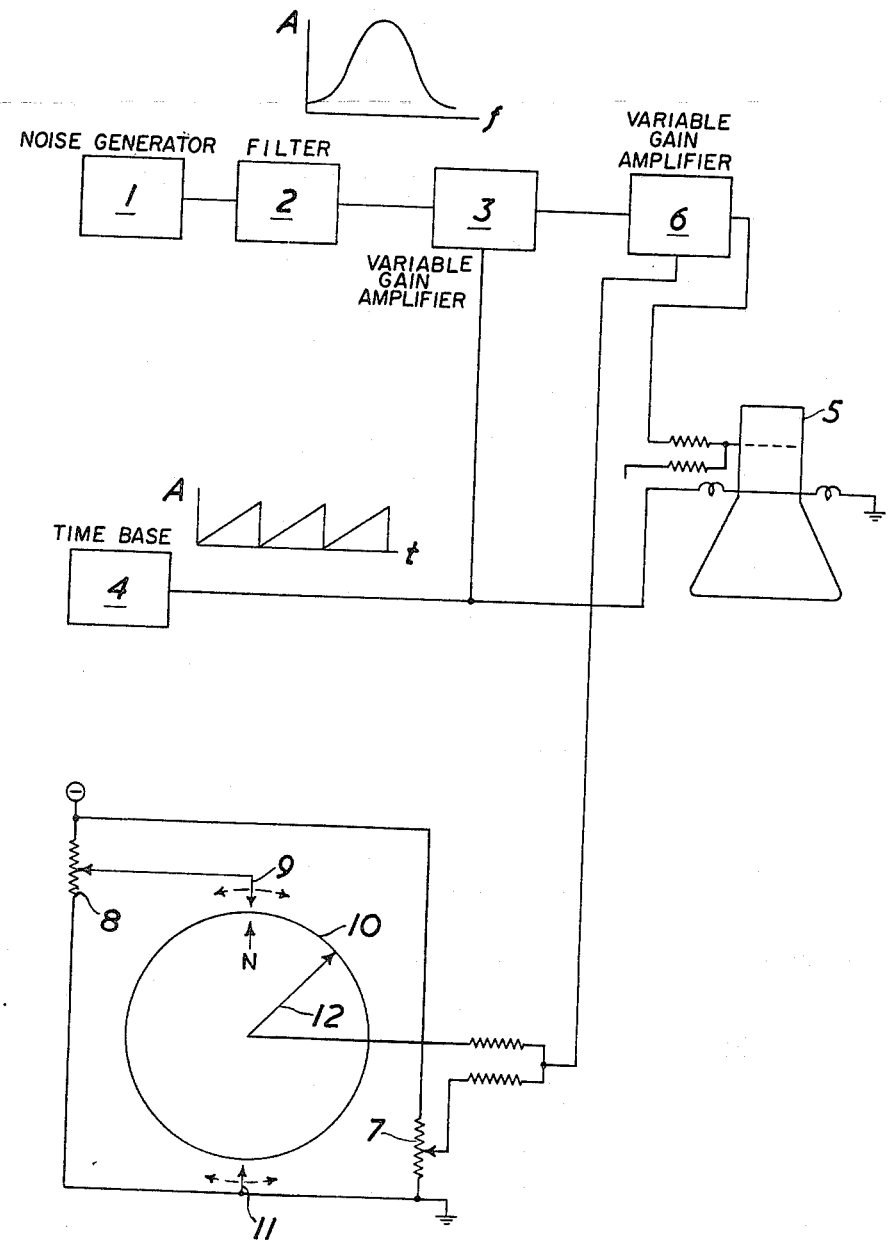

Albert Ernest Cutler, Crawley, England, assignor to Communications Patents Limited Filed Feb. 2, 1955, Ser. No. 485,637

Claims priority, application Great Britain Feb. 8, 1954

6 Claims. (Cl. 35—10.4)

This invention relates to radar training apparatus.

It has been proposed to train radar operators, pilots, etc., in the use of radar by means of radar simulation apparatus including a cathode ray tube on the screen of which synthetic echoes are produced.

When a radar beam is caused to scan the surface of the sea, echoes are obtained from the waves and are shown on the screen of the display tube as a white background. This is known as sea clutter and is normally of maximum amplitude in the direction from which the wind is blowing. Sea clutter makes it difficult for radar operators to extract from the screen of the radar tube information regarding ships, aircrafts or other objects in the area.

It is an object of the present invention to enable the appearance of sea clutter to be reproduced synthetically on the screen of a cathode ray tube in order to facilitate the training of radar operators.

According to one aspect of the invention apparatus for simulating the appearance on a screen of echoes from radar beam signals, includes a cathode ray tube, means for generating electric signals simulating "sea clutter" radar echoes resulting from the transmission of a radar beam signal, means for applying the generated signals to a brightness control circuit of the tube, and means for varying the effect of the generated signals on the screen of the tube as a function of the assumed azimuth of the beam.

The invention will now be described, by way of example only, with reference to the accompanying drawing which shows diagrammatically apparatus for simulating the appearance of sea clutter on a p.p.i. radar display.

The output of a source 1 of electrical noise, such as a gas-filled diode, is applied to a conventional wave filter 2 which attenuates the upper and lower frequency bands of the noise so as to give it a frequency characteristic similar to that of "sea clutter" radar echoes. A suitable noise generator useful as the source 1 is disclosed in the patent to Ring et al., No. 2,165,509, issued July 11, 1939, and also in Massachusetts Institute of Technology Radiation Laboratory Report No. 443, dated September 17, 1943. This characteristic is shown in the graph in which A represents amplitude and $f$ represents frequency.

The filtered noise is applied to a conventional variable gain amplifier 3, the gain of which is controlled by the output of a time base 4, for example, as disclosed in the text book "Time Bases" by O. S. Puckle, 2nd edition, which provides range strobe signals of sawtooth waveform, as shown in the diagram, in which A and $t$ represent amplitude and time respectively. These signals are applied to the deflection coils of a cathode ray tube 5, the coils being rotated in accordance with the assumed rotation of the scanning aerial of the simulated radar training apparatus. The control of the gain of the amplifier 3 is effected in such a way that when the range deflection signal is greatest, representing the maximum range shown on the tube screen, the gain of the amplifier 3 is least, so that its output, which is to be used to provide the sea clutter signal at the grid of the tube 5, is a minimum for this range. Similarly the output of the amplifier 3 is a maximum when the range strobe deflection signal is least, representing minimum range from the transmitter.

The output of the amplifier 3 is applied to a further conventional variable gain amplifier 6 which may be a variable-mu pentode controlled by negative voltages applied to its suppressor grid. The gain of this amplifier is controlled in accordance with the density of the sea clutter, and is also modified cyclically to represent the variation of the clutter amplitude with azimuth. The maximum density of the seat clutter is set up on a potentiometer 7, the wiper of which applies an adjustable negative bias to reduce the gain of the amplifier 6. From the wiper of a further pontentiometer 8, an adjustable negative potential is applied to a first wiper 9 of the circular potentiometer 10, a second wiper 11, which is always diametrically opposite the wiper 9, being connected to earth. The positions of these wipers on the circular potentiometer 10 represent bearings from the radar apparatus, and they can be moved round the circular potentiometer until the position of the wiper 11 represents the desired direction of maximum sea cutter. A further wiper 12 of the circular potentiometer is rotated at the same speed as and in angular synchronism with the simulated scanning aerial, i.e. in synchronism with the angular rotation of the range lines on the face of the tube 5. The varying potential at the wiper 12 is added to that of the wiper of the potentiometer 7 and their sum is applied to the amplifier 6 as a gain control voltage. As a result, the output of the pentode of the amplifier 6 is greatest when the wiper 12 passes the earthed wiper 11 and least when it passes the wiper 9, the difference between the sea-clutter densities as the wiper 12 passes the wipers 11 and 9 being controlled by the setting of the potentiometer 8. If the pentode of the amplifier 6 is driven to cut-off during a portion of each rotation of the wiper 12, the setting of the potentiometer 8 will control the angular width of this portion, and therefore the angular width of the area in which sea clutter is displayed. The maximum density of the sea clutter is controlled by the setting of the potentiometer 7.

The circular potentiometer may be replaced by any circuit or mechanism capable of generating a bias voltage or current, which may be synchronised to the simulated scanning aerial and used to modify cyclically the magnitude of the sea clutter signal.

What I claim is:

1. Apparatus for simulating the appearance on a screen of echoes from radar beam signals, comprising a cathode ray tube, a brightness control circuit therefor, means for generating electric signals simulating "sea clutter" radar echoes resulting from the transmission of a radar beam signal, a variable gain amplifier to which said generated signals are applied, means arranged to vary the gain of said amplifier as a function of the assumed azimuth of the beam, and means arranged to apply the signals from said variable gain amplifier to said brightness control circuit.

2. Apparatus as claimed in claim 1, including a potentiometer for providing a bias voltage for controlling the gain of said amplifier, and means adapted to control the output of said potentiometer as a function of the azimuth of the beam.

3. Apparatus for simulating the appearance on a screen of echoes from radar beam signals, comprising a cathode ray tube having scanning coils rotated in accordance with the assumed rotation of a simulated scanning aerial, a brightness control circuit for said cathode ray tube, means for generating electric signals simulating "sea clutter" radar echoes resulting from the transmission of a radar beam signal, means for modifying the generated signals as a function of the assumed azimuth of the beam including a circular potentiometer, a first wiper engaging said potentiometer and applying an adjustable potential to the latter, a second grounded wiper engaging said circular potentiometer at a location diametrically opposed to the location of said first wiper, a third wiper engaging said circular potentiometer and rotated in synchronism with the rotation of said scanning coils of the cathode ray tube so that the potential of said third wiper varies as the latter moves toward and away from the locations of said first and second wipers with the extent of the variation of the potential of said third wiper being determined by the adjustment of said potential applied by said first wiper and means responding to the varying potential of said third rotated wiper to vary said generated signals, and means applying the modified signals to said brightness control circuit.

4. Apparatus as in claim 3; wherein said first and second wipers are positionally adjustable together relative to said circular potentiometer thereby to establish the desired direction of maximum "sea clutter," while the adjustment if the potential applied by said first wiper establishes the desired difference between the maximum and minimum "sea clutter."

5. Apparauts for simulating the appearance on a screen of echoes from radar beam signals, comprising a cathode ray tube, a brightness control circuit for said tube, means for generating electric signals simulating "sea clutter" radar echoes resulting from the transmission of a radar beam signal, means for modifying the generated signals as a function of the assumed azimuth of the beam, means arranged to apply the modified signals to said brightness control circuit, deflection circuits for said cathode ray tube, a time base unit adapted to provide sawtooth range strobe signals for application to said deflection circuits, a variable gain amplifier arranged to receive said generated "sea clutter" signals, and means controlling the gain of said amplifier in accordance with the amplitude of said sawtooth signals.

6. Apparatus for simulating the appearance on a screen of echoes from radar beam signals, comprising a cathode ray tube, a brightness control circuit for said tube, means for generating electric signals simulating "sea clutter" radar echoes resulting from the transmission of a radar beam signal, a circular potentiometer including input contacts receiving the generated signals and a rotatable wiper and being operative to modify the generated signals as a function of the position of said wiper, means for rotating said wiper in accordance with change of azimuth of the beam, means for adjusting the positions of said input contacts relative to said rotatable wiper, for a given beam azimuth, in accordance with the directions of maximum and minimum sea clutter, and means applying the modified signals from said potentiometer to said brightness control circuit.

References Cited in the file of this patent

UNITED STATES PATENTS

| | | |
|---|---|---|
| 2,522,541 | Saxton et al. | Sept. 19, 1950 |
| 2,555,442 | Hales | June 5, 1951 |
| 2,562,987 | Laws | Aug. 7, 1951 |
| 2,605,556 | Jones | Aug. 5, 1952 |
| 2,652,636 | Garman et al. | Sept. 22, 1953 |
| 2,656,462 | Slack | Oct. 20, 1953 |
| 2,677,199 | Droz | May 4, 1954 |
| 2,713,729 | Springer | July 26, 1955 |